United States Patent [19]

Ostrup et al.

[11] Patent Number: 4,875,331

[45] Date of Patent: Oct. 24, 1989

[54] PRODUCT RECEIVING ARRANGEMENT FOR AGRICULTURAL MACHINES, ESPECIALLY FOR SELF-PROPELLING HARVESTER THRESHERS

[75] Inventors: Heinrich Ostrup; Josef Hegger, both of Harsewinkel, Fed. Rep. of Germany

[73] Assignee: CLAAS OHG, Fed. Rep. of Germany

[21] Appl. No.: 213,614

[22] Filed: Jun. 30, 1988

[30] Foreign Application Priority Data

Jul. 4, 1987 [DE] Fed. Rep. of Germany ....... 3722143

[51] Int. Cl.⁴ ............................................ A01D 34/04
[52] U.S. Cl. .......................................... 56/208; 56/296
[58] Field of Search ................. 56/208, 181, 314, 312, 56/296, 14.3

[56] References Cited

U.S. PATENT DOCUMENTS

| | | | |
|---|---|---|---|
| 2,795,922 | 6/1957 | Hume | 56/181 |
| 2,915,870 | 12/1959 | Hume | 56/208 |
| 3,886,718 | 6/1975 | Talbot | 56/208 |
| 4,212,144 | 7/1980 | Raineri | 56/208 |
| 4,573,308 | 3/1986 | Ehrecke et al. | 56/208 |
| 4,660,360 | 4/1987 | Hardesty et al. | 56/208 |

FOREIGN PATENT DOCUMENTS 2550249 9/1981 Fed. Rep. of Germany .

OTHER PUBLICATIONS

Copy of German Patent Office Search Report dated May 4, 1988.

Primary Examiner—John Weiss
Attorney, Agent, or Firm—Michael J. Striker

[57] ABSTRACT

A liftable and lowerable product receiving arrangement for agricultural machines, especially for self-propelling harvester threshers, comprises a cutting mechanism platform having a front end, a flexible cutting bar mounted on the front end of the cutting mechanism platform, sliding skids arranged to support the cutting bar in a height-displaceable manner relative to the cutting mechanism platform, and supporting skids associated with the cutting mechanism platform and arranged behind the flexible cutting bar as considered in a transporting direction and at least in its both lateral end regions, the supporting skids have lower limits extending at most at a height of one of the cutter bar and the sliding skids.

10 Claims, 1 Drawing Sheet

PRODUCT RECEIVING ARRANGEMENT FOR AGRICULTURAL MACHINES, ESPECIALLY FOR SELF-PROPELLING HARVESTER THRESHERS

BACKGROUND OF THE INVENTION

The present invention relates to a liftable and lowerable product receiving arrangement for agricultural machines, especially self-propelling harvester threshers.

More particularly, it relates to such a product receiving arrangement which has a cutting mechanism platform, a flexible mowing cutter bar mounted on the front end of the cutting mechanism platform, and sliding skids which support the cutting fingers of the cutting bar in a height-adjustable manner relative to the cutting mechanism platform.

Harvester threshers of the above-mentioned type are known in the art. One of such harvester threshers is disclosed, for example, in the German Pat. No. 2,550,248. It is especially suitable for harvesting of soybeans and the like. During the operation the cutting bar which is arranged in a position-flexible manner relative to the cutting mechanism platform, is supported through sliding skids on the ground. With the aid of cutting regulating devices which are provided on many harvester threshers, the supporting pressure of the sliding skids is preselected and postregulated as a main acting value for the stopping height. Despite this available regulating device, the cutting mechanism in practice is always subjected to grave damages. During operation with high forward speed on very uneven soils, the regulating device operates too slow and moreover in a very small region.

SUMMARY OF THE INVENTION

Accordingly, it is an object of the present invention to provide a product receiving arrangement of the above-mentioned general type which avoids the disadvantages of the prior art.

More particularly, it is an object of the present invention to provide a product receiving arrangement in which serious damages to the cutting mechanism can be reliably avoided.

In keeping with these objects and with others which will become apparent hereinafter, one feature of the present invention resides, briefly stated, in a product receiving arrangement in which supporting skids are associated with the cutting mechanism platform behind the flexible cutting mechanism as considered in a travelling direction and arranged at least in its both lateral end regions, and lower limits of the supporting skids are located in or below a horizontal plane of the flexible cutting mechanism.

When the liftable and lowerable product receiving arrangement is designed in accordance with the present invention, the sliding skids of the flexible cutting mechanism follow the contour of the ground as long as normal ground conditions occur. In the event of significant ground unevenness which occurs during the operation, the whole product receiving arrangement is intercepted by additional supporting skids so that grave damages to the sensitive cutting mechanism are prevented.

In accordance with another feature of the present invention, the supporting skids are adjustable in their height.

Still another object of the present invention is that the supporting skids are connected with the cutting mechanism platform through holding means.

The holding means can be arranged so that they are regulatable at one end, while their another end is arrestable at different heights.

Finally, the supporting pressure of the supporting skids can be used as a regulating value for the displacement of the cylinder-piston unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
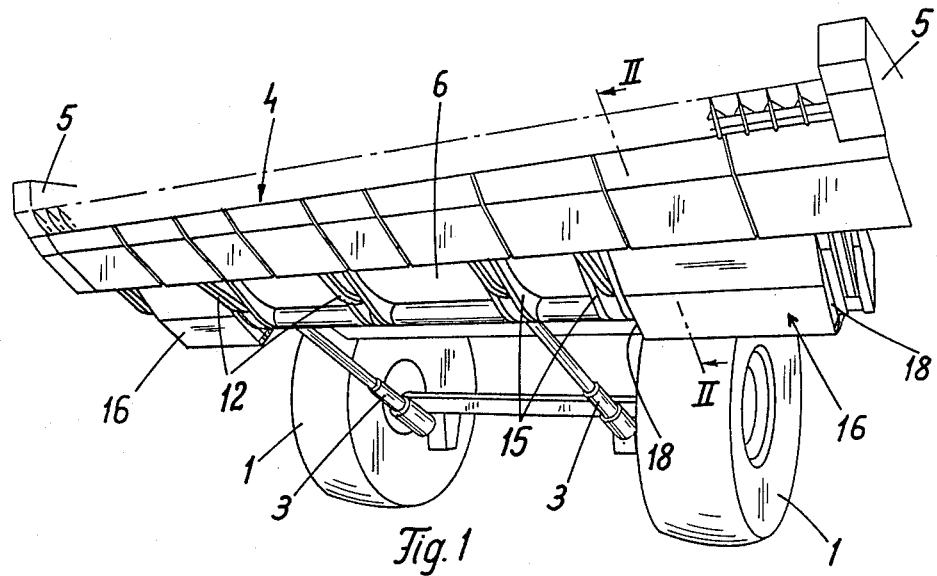
FIG. 1 is a perspective view showing a cutting table of a harvester thresher.

A self-propelled harvester thresher in accordance with the present invention is shown only partially in the drawings. It has front drive wheels which are identified with reference numeral 1 and connected with one another by an axle 2.

Two lifting cylinder-piston units 3 are connected with the axle 2 at their one end. The harvester thresher has further a receiving device 4 for the agricultural products. The receiving device 4 can be adjusted as to its height by means of the cylinder-piston units 3.

The agricultural product receiving device 4 has two side members 5, a lower cutting mechanism platform 6, and a traverse 7 which extends in a transverse direction. A supporting arm 8 for a pickup reel 9 is connected with the side members 5. A transporting drum 11 is arranged behind the pickup reel 9 between both side members 5. The transporting drum 11 is provided with screw plates 10 and not shown controlled pickup fingers.

Figure 2:
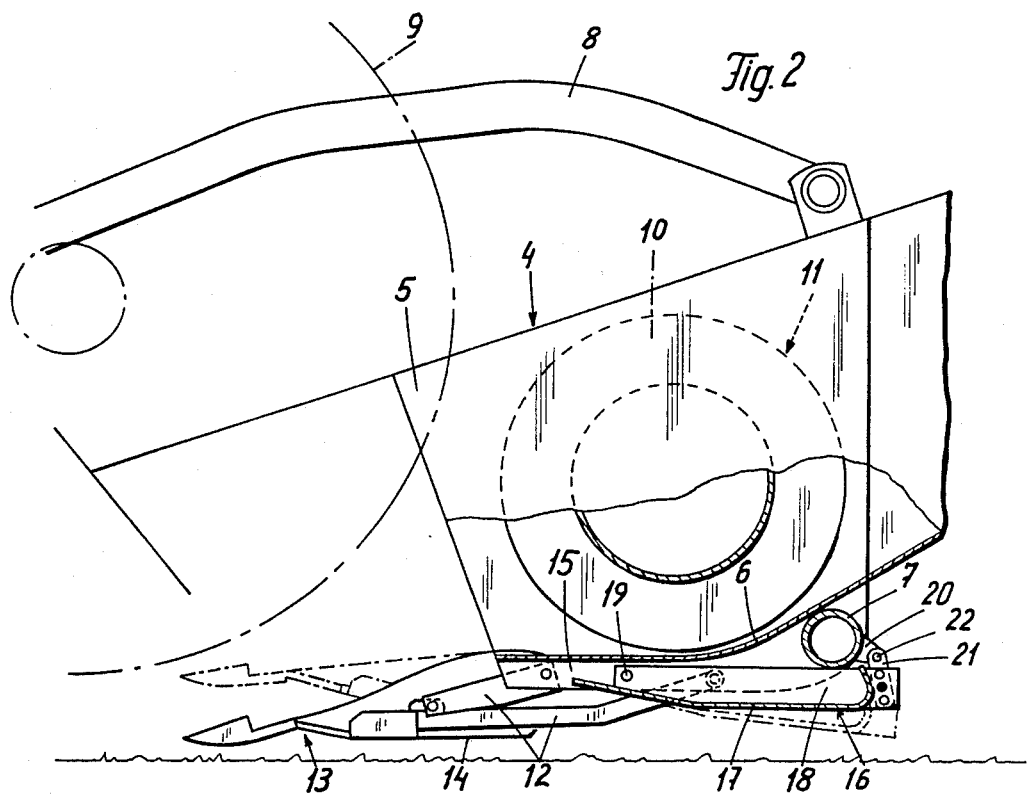
FIG. 2 is a view showing the cutting table of the harvester thresher from a side, with a local cut taken along the line II—II in FIG. 1.

As can be seen from FIG. 2, links 12 are connected with the cutting mechanism platform 6. The links 12 carry flexible mower cutter bar 13 which is guided through sliding skids 14 on the ground of the field. The links 12 are rotatably connected with lower parts 15 of the cutting mechanism platform 4.

Box-shaped sliding skids 16 are provided behind the cutter bar 13 as considered in a travelling direction of the harvester thresher. The sliding skids 16 are also rotatably connected with an end of the frame parts 15. The sliding skids 16 extend transversely to the travelling direction in its overall dimension between two neighboring frame parts. The sliding skids are composed of a bottom plate 17 and two side walls 18. The side walls 18 are connected by pivot pins 19 with the neighboring frame parts 15.

The height of the skids 16 is fixed at their rear end, or in other words at the end which faces the drive wheels 11. For this purpose a strut 20 is welded with the traverse 7. A perforated strap 21 is mounted on the free end of the strut 20 by means of pivot pin 22. In correspondence with respective requirements, the sliding skids 14 can be adjusted as to their height, in that the perforated strap 21 is screwed with the side walls 18 by means of pins 23.

The skids 16 as well as two holding elements 20, 21, 22 associated with each skid form together a rigid unit which supports the whole product receiving arrangement, for example when one of the front drive wheels gets into a depression on the field. The sensitive flexible cutting mechanism is thereby substantially protected.

In accordance with the present invention it is also possible to control the operation of the cylinder-piston unit 3 in dependence upon a supporting pressure of the sliding skids 16. A simple control circuit can be provided, in which a sensing element can be arranged on the supporting skids to sense its supporting pressure, and the signal from the sensing element is transmitted to a controller which controls the operation of the cylinder-piston unit 3. Thereby the vertical adjustment of the cutting mechanism platform 6 can be performed in dependence on the supporting pressure of the supporting skids 16.

It will be understood that each of the elements described above, or two or more together, may also find a useful application in other types of constructions differing from the types described above.

While the invention has been illustrated and described as embodied in a product receiving arrangement for agricultural machines, especially for a self-propelling harvester thresher, it is not intended to be limited to the details shown, since various modifications and structural changes may be made without departing in any way from the spirit of the present invention.

Without further analysis, the foregoing will so fully reveal the gist of the presnt invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A liftable and lowerable product receiving arrangement for agricultural machines, especially for self-propelling harvester threshers, comprising a cutting mechanism platform having a front end; a flexible cutting bar mounted pivotally on said front end of said cutting mechanism platform and extending substantially in a horizontal plane; sliding skids arranged to support said cutting bar in a height-displaceable manner relative to said cutting mechanism platform; and supporting skids connected to said cutting mechanism platform and arranged behind said flexible cutting bar as considered in a transporting direction and at least in its both lateral end regions, said supporting skids having lower limits extending at most at a height of one of said cutter bar and said sliding skids, said supporting skids being separate from and independent of said sliding skids.

2. A liftable and lowerable product receiving arrangement as defined in claim 1, wherein said lower limits of said supporting skids are located in said horizontal plane.

3. A liftable and lowerable product receiving arrangement as defined in claim 1, wherein said lower limits of said supporting skids are located under said horizontal plane.

4. A liftable and lowerable product receiving arrangement as defined in claim 1, wherein said lower limits of said supporting skids are located at most at a height of a horizontal plane of said flexible cutter bar.

5. A liftable and lowerable product receiving arrangement as defined in claim 1, wherein said lower limits of said supporting skids are located at most at a height of a horizontal plane of said sliding skids.

6. A liftable and lowerable product receiving arrangement as defined in claim 1, wherein said supporting skids are height adjustable.

7. A liftable and lowerable product receiving arrangement as defined in claim 1; and further comprising holding means which connects said supporting skids with said cutting mechanism platform.

8. A liftable and lowerable product receiving arrangement as defined in claim 7, wherein said holding means has one end which is supported in a regulatable manner and another end which is arrestable at different heights.

9. A liftable and lowerable product receiving arrangement as defined in claim 1; comprising first attaching means which attach said sliding skids to said cutting mechanism platform, and second attaching means for attaching said supporting skids to said cutting mechanism platform independently of said sliding skids.

10. A liftable and lowerable product receiving arrangement as defined in claim 9, wherein said first attaching means are formed so as to turnably attach said sliding skids to said cutting mechanism platform, the second attaching means being formed so as to turnably attach said supporting skids to said cutting mechanism platform.

* * * * *